United States Patent
Gottschling et al.

(10) Patent No.: US 6,743,379 B2
(45) Date of Patent: Jun. 1, 2004

(54) ANTISTATIC POWDER COATING COMPOSITIONS AND THEIR USE

(75) Inventors: Peter Gottschling, Columbus, OH (US); Zbigniew Stachyra, Dublin, OH (US); Maria Strid, Västervik (SE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/148,707

(22) PCT Filed: Dec. 1, 2000

(86) PCT No.: PCT/EP00/12084

§ 371 (c)(1),
(2), (4) Date: Nov. 4, 2002

(87) PCT Pub. No.: WO01/40388

PCT Pub. Date: Jun. 7, 2001

(65) Prior Publication Data

US 2003/0116754 A1 Jun. 26, 2003

(30) Foreign Application Priority Data

Dec. 4, 1999 (DE) .......................... 199 58 485

(51) Int. Cl.⁷ .............................. H01B 1/00; C08D 5/03
(52) U.S. Cl. .................. 252/511; 252/500; 252/502; 252/518.1; 428/913
(58) Field of Search ................ 252/502, 511, 252/518.1, 506; 428/913; 241/22; 156/230

(56) References Cited

U.S. PATENT DOCUMENTS

| 3,860,557 | A | | 1/1975 | Millar et al. |
|---|---|---|---|---|
| 3,932,348 | A | * | 1/1976 | Camelon et al. ............ 523/205 |
| 4,017,366 | A | | 4/1977 | Hsieh et al. |
| 4,027,366 | A | | 6/1977 | Millar et al. |
| 4,374,954 | A | * | 2/1983 | Labana et al. ............... 525/207 |
| 4,680,139 | A | * | 7/1987 | Williams et al. ............ 252/511 |
| 5,962,148 | A | * | 10/1999 | Nishimura et al. ......... 428/522 |
| 6,360,974 | B1 | * | 3/2002 | Sacharski et al. ............. 241/16 |
| 6,506,843 | B1 | * | 1/2003 | Tsuda et al. ................ 525/199 |

FOREIGN PATENT DOCUMENTS

| CN | 1099779 | | 3/1995 | |
| DE | 19809838 | * | 11/1998 | ............ C09D/5/03 |

OTHER PUBLICATIONS

"Acrylics–Surface Resistivity Table". Polymers–A Property Database Chapman & Hall, CRC Press 2000.*

N.G. Schibrya et al., "Antistatic decorative coatings based on coating powders" Electron, Russia Lakokras Mater. Ikh Primen. (1996) (12), pp. 19–20. (TRANSLATION enclosed).

* cited by examiner

Primary Examiner—Yogendra N. Gupta
Assistant Examiner—Kallambella Vijayakumar
(74) Attorney, Agent, or Firm—Steven C. Benjamin

(57) ABSTRACT

This invention relates to a powder coating composition comprising a mixture of conventional, possibly coloured, non-conductive thermosetting powder coating compositions with highly conductive thermosetting powder coating compositions so as to produce a coating having an electrical surface resistance of less than $10^{10}$ Ω (ohm), preferably of less than $10^8$ Ω (ohm), and to the substrates coated therewith. This invention also relates to using a mixture of non-conductive and conductive powder coating compositions to produce a coated surface having an electrical surface resistance sufficiently low to possess antistatic properties.

17 Claims, No Drawings

ANTISTATIC POWDER COATING COMPOSITIONS AND THEIR USE

BACKGROUND OF THE INVENTION

This invention relates to a powder coating composition, its use for the preparation of coated surfaces with antistatic properties and the coated substrates.

Thermosetting powder coatings are applied as protective or decorative finishes in a variety of applications. Easy application, low emissions and low waste materials generation are key advantages of powder coatings. Powder coatings are normally applied by electrostatic spray processes. The powder is charged by friction or by a corona discharge and then applied to the substrate where it adheres by electrostatic forces. The substrate is heated to temperatures above the softening point of the powder coating. The powder coating then melts and forms a continuous film on the substrate. On further heating, the crosslinking reaction of the coating composition is initiated. After cooling, a durable, flexible coating is obtained.

In certain applications it is desirable that coated surfaces have a low electrical surface resistance to provide antistatic or even electrical conductive properties. Examples are furniture used in assembly areas for electronical equipment, furniture or equipment used in explosion proof areas, containers or housing for electronic equipment etc. Standards for the surface conductivity of materials that are used in areas where devices are handled which are sensitive to electrostatic discharge can for instance be found in the European Standard EN 100 015-1 or the Swedish Standard SP-Method 2472.

Conventionally, the antistatic or electrical conductive properties are obtained by application of liquid paint that contains high amounts of conductive additives like carbon black, specially coated pigments or metallic powders.

Many attempts have been made to increase the electrical conductivity of powder coatings to allow the use of powder coatings in the areas mentioned above. For instance, patent application CN 1099779 describes the addition of conductive micro particles like graphite, acetylene black or zinc oxide in relatively high concentrations to powder coating formulations. This procedure has the disadvantage that the coatings containing graphite or acetylene black generally do not allow to formulate light coloured coatings. On the other hand, high amounts of light coloured fillers like zinc oxide give coatings with poor reproducibility of the electrical conductivity (see "N. G. Schibrya et. al." Antistatic decorative coatings based on coating powders "Electron", Russia Lakokras. Mater. Ikh Primen. (1996) (12), page 19–20 and references cited therein). In this reference, conductive coatings with very high loads of metallic powders are disclosed. Such powder coating compositions have a very high specific gravity and are therefore difficult to apply to a substrate. In addition, the use of fine metal powders imposes safety risks during the powder manufacturing and application.

The German patent application DE-A-198 09 838 claims the addition of conductive polymeric materials to increase the electrical conductivity of powder coated surfaces. Again, these polymers have a black or dark colour and result in dark coloured powder coatings.

In the U.S. patent U.S. Pat. No. 4,027,366, the application of mixtures of powders that have differences in the dielectric constant is described whereby one powder material is a conductive metal or nonmetal. The object of U.S. Pat. No. 4,027,366 is to produce multi layer coatings in one step. The preparation of coatings with antistatic properties or a low electrical surface resistance of the coated surface is not mentioned.

Accordingly, it is the object of the invention to provide powder coatings that have a low and reproducible electrical surface resistance of the coated substrate surface, can be prepared in various colours and are easy to apply even with variation in the coating film thickness.

SUMMARY OF THE INVENTION

This object is achieved by a mixture of conventional, possibly coloured, non-conductive thermosetting powder coating materials with highly conductive thermosetting powder coating materials. The ratio of the conductive to the non-conductive powder coating materials in the inventive mixture can be between 2.5 to 95 and 95 to 2.5. The ratio can be adjusted to meet the requirements for the electrical surface resistance in a specific application. Generally, a higher percentage of the conductive component in the blend yields a lower electrical surface resistance of the final coating. The mixture according to the invention results in coloured coatings that have an electrical surface resistance of less than $10^{10}$ Ω (ohm), preferably of less than $10^8$ Ω (ohm). This surface resistance is sufficiently low for many applications that require antistatic properties of a surface.

DETAILED DESCRIPTION OF THE INVENTION

The non-conductive thermosetting powder coating material in the inventive mixture can be any thermosetting powder coating composition. The powder can be coloured or transparent, e.g. clear coat.

The powder compositions which may be used for example, are those based on polyester resins, epoxy resins, polyester/epoxy hybrid resin systems, (meth)acrylic resins, polyurethane resins. Suitable crosslinking resins for the binder/hardener system are, for example, di- and/or polyfunctional epoxides, carboxylic acids, dicyandiamide, phenolic resins and/or amino resins, in the usual quantity. The compositions may contain constituents conventional in powder coating technology, such as pigments and/or fillers and further additives.

Suitable powder coating formulations are for instance described in D. A. Bates "The Science of Powder Coatings" Volume 1, Sita Technology, London, 1990. Surfaces that are coated with such powder coating materials generally have an electrical surface resistance of greater than $10^{10}$ Ω (ohm).

The conductive thermosetting powder coating composition of the inventive mixture contains contains high concentrations of inorganic or organic conductive fillers and/or pigments. Such fillers and/or pigments may for instance be carbon black, conductive polymeric materials or light coloured inorganic pigments. If carbon black or conductive polymeric materials are used, the conductive powder materials are generally black or dark coloured. Examples for conductive polymeric materials are polyaniline, polypyrole or polythiophene or their derivatives. For light coloured conductive powder coatings may be used metal oxides, non-metal oxides, conductively coated barium sulphate or potassium titanate, doped tin dioxide, doped zinc oxide (doped for example with aluminium, gallium, antimony, bismuth), or special inorganic pigments can be used. Examples of such special inorganic pigments are metal oxide coated mica platelets like zinc oxide coated mica, antimony doped tin oxide coated mica and which are given in R. Vogt et. al "Bright conductive pigments with layer substrate structure", European Coatings Journal, page 706, 1997. For economic reasons, it is preferred to use carbon black as conductive filler. The conductive powder coating material useful for the mixtures according to the invention contains between 1 and 20 weight %, preferably between 2 and 10 weight % of the conductive fillers and/or pigments. It is also possible to use mixtures of different conductive fillers and/or pigments to formulate the conductive powder coating material. In general, coatings prepared from the conductive powder coating without the addition of non-conductive powders should have an electrical surface resistance of less than $10^6$ $\Omega$(ohm) or at least by a factor of 10 lower than the desired surface resistance of the surfaces where the mixture according to the invention was applied to. This means that the conductive component must for example have an electrical surface resistance of less than $10^7$ $\Omega$ (ohm) if the mixture with non-conductive powders should have a surface resistance of less than $10^8$ $\Omega$.

The binder/hardener system of the conductive powder material can be the same as for the none conductive powder material in the mixture according to the invention or it can be different. For smooth finishes, it is preferred to use the same binder/hardener system in the conductive and the non conductive powder material of the mixture.

It is possible to match the colour of the non-conductive material of the powder mixture and the conductive powder if light coloured conductive pigments or fillers are used to generate a uniform coating colour. However, it is also possible and preferred to use a black conductive powder in combination with non conductive powders that have a different colour e.g. white, grey, red or yellow. Such mixtures will generate a coating with a sprinkle effect because the individual colours of the powders will be more or less visible to the human eye. Such coatings yield attractive finishes that are suitable for many applications.

The conductive and the non-conductive thermosetting powder coating materials that are required for the mixture according to the invention can be prepared by known powder coating manufacturing technologies, for instance by known extrusion/milling techniques, by spay processes e.g. from supercritical solutions, or by melt atomisation, or by suspension/dispersion processes, e.g. non-aqueous dispersion process.

The powder materials useful for the mixture according to the invention have for example a mean particle size from 10 to 100 $\mu$m, preferably from 15 to 50 $\mu$m. The conductive and the non conductive powder materials can have the same mean particle size and the same particle size distribution. It is also possible to mix powder materials that have different mean particle sizes or different particle size distributions. A similar particle size distribution for all components of the inventive mixture is preferred. It is also preferred to select powder materials for the mixture that have a similar specific gravity.

The mixture according to the invention can be prepared by standard mixing devices that deliver homogeneous mixtures of powders like tumble mixers, high shear rotating blade mixers or continuous mixers. It is also possible to use special mixers potentially at slightly elevated temperatures that are normally used to bond pigments to powder coatings. If such mixers are used, the different powder materials are at least partially bonded to each other which may be advantageous for certain applications.

The inventive mixture can be applied to various substrates like metals, plastics, wood or wood composites by known powder application technologies, for instance by electrostatic spray processes using corona or tribo charge. It is also possible to apply the powder mixture in the form of an aqueous dispersion or a powder slurry.

The substrate is then heated by suitable means to temperatures that allow the powder coating to flow out and cure. The temperature and time required for melting and curing will depend on the binder/hardener system used in the powder coating formulation. Typical conditions are for example temperatures of 160° C. for 20 minutes if convection ovens are used to heat up the substrate. Significantly shorter time periods can be accomplished if infra red or near infra red (NIR) radiation is used to melt and cure the powder coatings. It is also possible to formulated powder coatings that can be cured by UV-radiation. In this case it is preferred that both, the conductive and the non conductive material of the powder mixture can be cured by UV-radiation.

Typical film thicknesses of the coating after curing are for example between 20 and 150 $\mu$m. It is a special advantage of the present invention that the surface resistance of the coating is not sensitive to the film thickness which is critical in many applications where variations in film thickness cannot be avoided. In general, a coating thickness between 50 and 100 $\mu$m is preferred.

The powder coatings according to the invention provide surfaces in various colours with an attractive smooth finish and a low and reproducible surface resistance suitable for the use as antistatic coating. The degree of gloss can be adjusted by known powder coating technology.

The following examples further illustrate the invention:

The electrical surface resistance of the coatings was measured with the "Test Kit for Static Control Surfaces" supplied by 3M which meets the requirements of the standard EOS/ESD-S4.1-1990.

Preparation of a Conductive Powder Coating

EXAMPLE 1

A mixture consisting of 16 wt.-% epoxy resin, 42 wt.-% polyester resin, 37 wt.-% barium sulphate, 3.5 wt.-% carbon black and 1.5 wt.-% flow and degassing agents is intimately blended, and extruded at a temperature between 110 and 140° C. The extrudate is ground into a fine black powder with a mean particle size of 38 $\mu$m.

The powder material is applied by electrostatic spray application to a steel panel and is then cured for 10 minutes at 200° C. The coating obtained has an electrical surface resistance of $10^4$ to $10^5$ $\Omega$ (ohm) measured at 100V and a coating thickness of 90 $\mu$m.

Mixtures According to the Invention

EXAMPLE 2

The conductive powder material from example 1 is intimately mixed in a tumble mixer with a commercial blue polyester/epoxy hybrid powder in a ratio of 20/80 (weight by weight). The resulting mixture is applied by electrostatic spray application to a steel panel and then cured for 10 minutes at 200° C. A blue smooth finish with black sprinkles is obtained that has a surface resistance of $10^5$ to $10^6$ $\Omega$ (ohm) when measured at 100V and a coating thickness of 90 $\mu$m.

EXAMPLE 3

The conductive powder material from example 1 is intimately mixed in a tumble mixer with a commercial red polyester/epoxy hybrid powder in a ratio of 30/70 (weight by weight). The resulting mixture is applied by electrostatic spray application to a steel panel and the coating is then cured for 10 minutes at 200° C. A red smooth finish with black sprinkles is obtained that has a surface resistance of $10^5$ to $10^6$ Ω (ohm) when measured at 100V and coating thicknesses of 60 μm and 100 μm.

What is claimed is:

1. A powder coating composition comprising a mixture of
   at least one conductive thermosetting powder coating composition comprising at least one conductive filler selected from carbon black, and
   at least one non-conductive thermosetting powder coating composition comprising a non-black color;
   wherein the weight ratio of the at least one conductive thermosetting powder coating composition to the at least one non-conductive thermosetting powder coating composition is between 2.5 to 95 and 95 to 2.5;
   wherein said powder coating composition produces a coating having an electrical resistance of less than $10^{10}$ ohm.

2. The powder coating composition of claim 1 wherein a cured layer of the at least one conductive thermosetting powder coating composition has an electrical surface resistance of less than $10^6$ ohms.

3. The powder coating composition of claim 1 wherein a cured layer of the at least one non-conductive thermosetting powder coating composition has an electrical surface resistance greater than $10^{10}$ ohms.

4. The powder coating composition of claim 1 wherein the at least one conductive thermosetting powder coating composition comprises 1–20 wt. % of the carbon black conductive filler.

5. The powder coating composition of claim 1 wherein the conductive thermosetting powder coating composition further comprises at least one conductive polymeric material selected from polyaniline and derivatives thereof, polypyrole and derivative thereof, polythiophene and derivatives thereof, and mixtures thereof.

6. The powder coating composition of claim 5 wherein the conductive thermosetting powder coating composition contains from 1–20 wt. % of the carbon black conductive filler and/or the at least one conductive polymeric material.

7. The powder coating composition of claim 1 curable by high energy radiation selected from the group consisting of infrared radiation, near infrared radiation and UV radiation.

8. A substrate coated with a cured layer of the powder coating composition of claim 1.

9. The coated substrate of claim 8 wherein the surface properties of the layer are antistatic properties.

10. A light colored powder coating composition comprising a mixture of
    at least one conductive thermosetting powder coating composition comprising at least one conductive light colored inorganic pigment selected from metal oxides, non-metal oxides, conductively coated barium sulphate, conductively coated potassium titanate, doped tin dioxide, doped zinc oxide, metal oxide coated mica platelets, and mixtures thereof; and
    at least one non-conductive thermosetting powder coating composition;
    wherein the weight ratio of the at least one conductive thermosetting powder coating composition to the at least one non-conductive thermosetting powder coating composition is between 2.5 to 95 and 95 to 2.5;
    wherein said powder coating composition produces a light-colored coating having an electrical resistance of less than $10^{10}$ ohm.

11. The powder coating composition of claim 10 wherein a cured layer of the at least one conductive thermosetting powder coating composition has an electrical surface resistance of less than $10^6$ ohms.

12. The powder coating composition of claim 10 wherein a cured layer of the at least one non-conductive thermosetting powder coating composition has an electrical surface resistance greater than $10^{10}$ ohms.

13. The powder coating composition of claim 10, wherein the conductive thermosetting powder coating composition comprises 1–20 wt. % of the least one conductive light colored inorganic pigment.

14. The powder coating composition of claim 10, wherein the at least one conductive thermosetting powder coating composition further comprises at least one conductive polymeric material selected from polyaniline and derivatives thereof, polypyrole and derivatives thereof, polythiophene and derivatives thereof, and mixtures thereof.

15. The powder coating composition of claim 14, wherein the conductive thermosetting powder coating composition contains 1–20 wt. % of the at least one conductive light colored inorganic pigment and/or the at least one conductive polymeric material.

16. A process for preparing a powder coating composition comprising mixing at least one conductive thermosetting powder coating composition comprising at least one conductive filler selected from carbon black with at least one non-conductive thermosetting powder coating composition comprising a non-black color;
    wherein the weight ratio of the at least one conductive thermosetting powder coating composition to the at least one non-conductive thermosetting powder coating composition is between 2.5 to 95 and 95 to 2.5.

17. The process according to claim 16, wherein said powder coating composition produces a coating having an electrical resistance of less than $10^{10}$ ohm.

* * * * *